D. COLLAR.
FIRELESS COOKER OR ROASTER.
APPLICATION FILED JUNE 24, 1916.

1,229,032.

Patented June 5, 1917.

Witnesses

Inventor
Drucilla Collar,
By Victor J. Evans
Attorney

UNITED STATES PATENT OFFICE.

DRUCILLA COLLAR, OF FLORENCE, COLORADO.

FIRELESS COOKER OR ROASTER.

1,229,032.  Specification of Letters Patent.  Patented June 5, 1917.

Application filed June 24, 1916.  Serial No. 105,625.

*To all whom it may concern:*

Be it known that I, DRUCILLA COLLAR, a citizen of the United States, residing at Florence, in the county of Fremont and State of Colorado, have invented new and useful Improvements in Fireless Cookers or Roasters, of which the following is a specification.

The invention relates to a cooker, and more particularly to the class of fireless cookers or roasters.

The primary object of the invention is the provision of a roaster or cooker of this character wherein the cooking well or chamber is fitted with a removable partition, whereby said chamber can be used as a single or double compartment, so that either large or small pans can be placed therein for the cooking of the contents thereof or the roasting of the same.

Another object of the invention is the provision of a cooker or roaster of this character wherein the construction thereof is novel in form to assure the perfect working thereof and for the successful retention of the heat for cooking purposes.

A further object of the invention is the provision of a roaster or cooker of this character which is extremely simple in construction, thoroughly reliable and efficient in its purpose, strong, durable and inexpensive in manufacture.

Other objects will be in part obvious and in part hereinafter pointed out.

The invention accordingly consists in the features of construction, combination of elements and arrangement of parts which will be exemplified in the construction hereinafter set forth, and the scope of the application of which will be defined in the appended claim.

In the accompanying drawings.

Similar reference characters indicate corresponding parts throughout the several views of the drawing.

Figure 1:
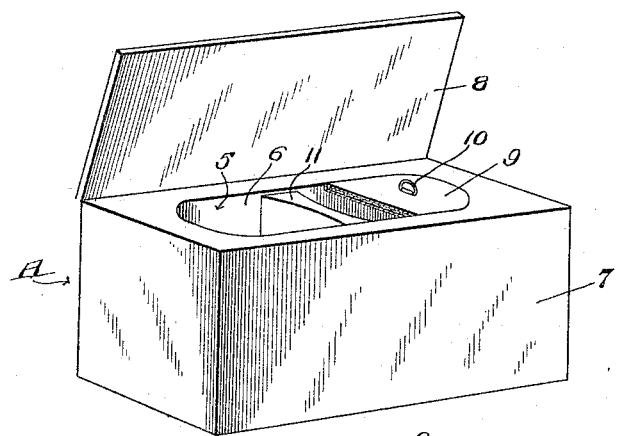
Figure 1 is a perspective view of the roaster or cooker constructed in accordance with the invention, with the hinged lid raised.
Figure 2:
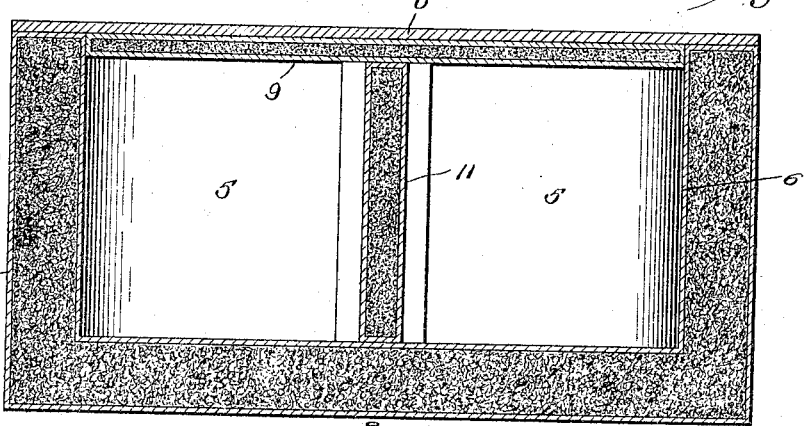
Fig. 2 is a vertical longitudinal sectional view thereof.
Figure 3:
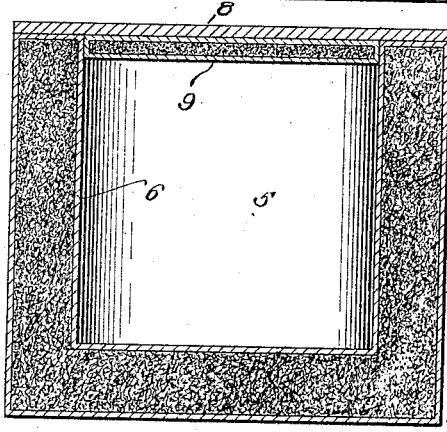
Fig. 3 is a vertical transverse sectional view.

Referring to the drawing in detail, the cooker or roaster comprises a box-like body A formed with an elongated well having rounded ends to provide a cooking chamber 5, which opens through the top of the body A and is formed by a lining 6, while the space between the latter and the walls of the body A is packed with material 7, such as wool, serving as a non-conductor of heat.

Hinged to one longer wall of the body A is a lid 8, while removably fitted in the upper open end of the well or cooking chamber 5 is a cover 9, provided with swinging loop handles 10, so that it can be conveniently removed for the opening of the well or cooking chamber 5, and this cover is so constructed as to fit snugly within the upper open end of the said well or cooking chamber 5 to seal the same for preventing the escape of heat therefrom during the cooking process. The cover is provided with a heat resisting lining composed of mineral wool or the like, for the purpose of preventing escape of heat from the cooking chamber.

Located within the well or cooking chamber 5, medially thereof, is a removable partition 11 so that the said compartment can be divided into two cells or chambers for receiving smaller pans, and upon the removal of the partition 11 the well or compartment 5 will accommodate a larger pan, thereby enabling the cooking or roasting of the contents of one or more pans. This partition is formed of 2 oppositely disposed arcuate walls spaced apart to accommodate a heat proof packing, such as mineral wool, the shape of these walls providing at each end of the partition a greater thickness of the heat resisting lining and reducing the space at the juncture of the ends of this partition with the walls of the cooking chamber, so that when circular vessels are placed therein they will practically occupy the entire area of the chamber.

It is of course understood that a suitable heating unit can be placed within the bottom of the well or compartment 5, as usual, or an electric heater can be placed therein, or, in lieu thereof, the said compartment can be heated by gas.

From the foregoing description, taken in connection with the accompanying drawing, the construction and manner of use of the cooker will be readily understood, and a more extended explanation has, therefore, been omitted.

Having thus described my invention, I claim:

A fireless cooker comprising a body having a heating chamber opening through the top thereof, said body containing a filling forming a non-conductor of heat, a lid hinged to the body, a removable cover for the chamber, and a removable heat-insulating partition formed with oppositely arranged arcuate walls arranged within the chamber.

In testimony whereof I affix my signature in presence of two witnesses.

DRUCILLA COLLAR.

Witnesses:
H. A. COLLAR,
E. F. JACK.

Copies of this patent may be obtained for five cents each, by addressing the "Commissioner of Patents, Washington, D. C."